(No Model.) 2 Sheets—Sheet 1.
J. C. TAYLOR.
WEEDING CARRIAGE.
No. 247,856. Patented Oct. 4, 1881.
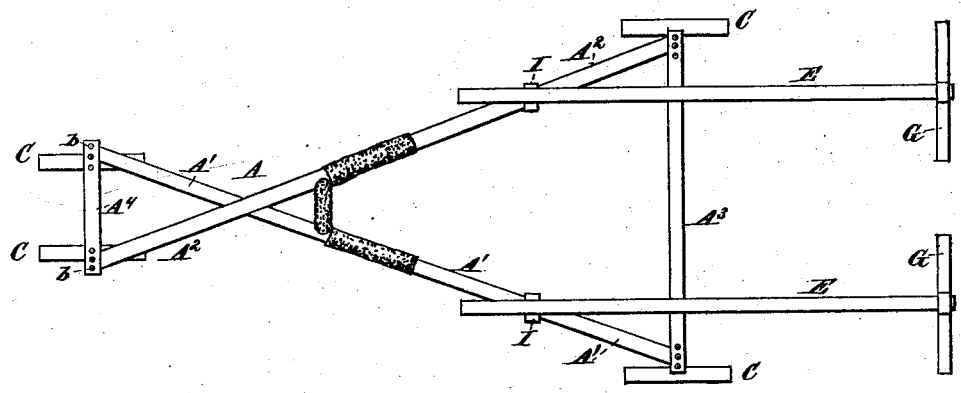
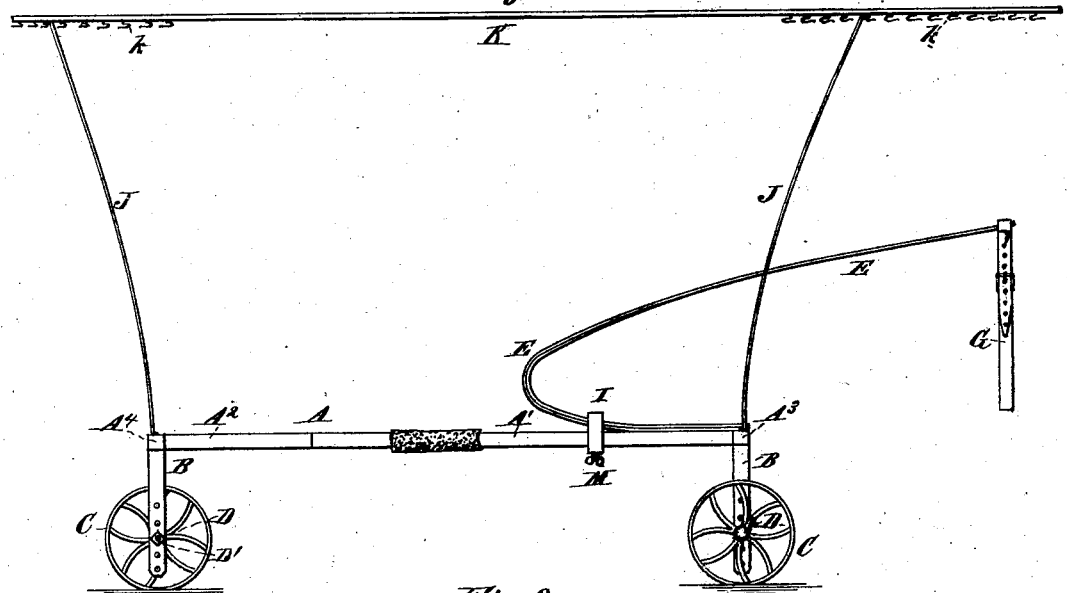
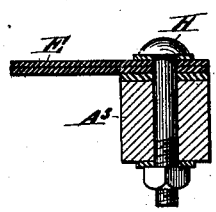
WITNESSES
Charles R. Searle.
Katie R. Ackel.
INVENTOR
Jonathan C. Taylor
by his attorney (No Model.) 2 Sheets—Sheet 2.
J. C. TAYLOR.
WEEDING CARRIAGE.
No. 247,856. Patented Oct. 4, 1881.
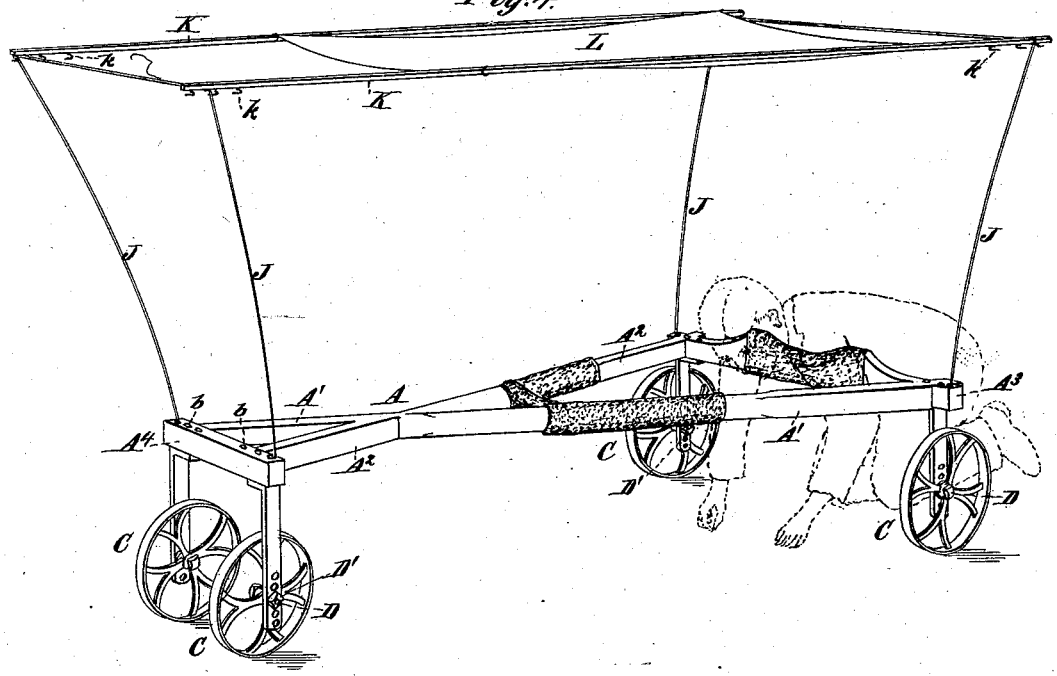
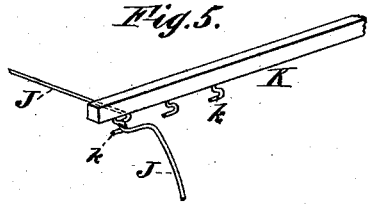
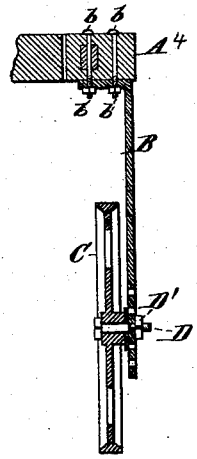
WITNESSES
Charles R. Searle,
Hatie R. Acker.
INVENTOR
Jonathan C. Taylor
by his attorney
Thomas D. Stetson

UNITED STATES PATENT OFFICE.

JONATHAN C. TAYLOR, OF WESTPORT, CONNECTICUT.

WEEDING-CARRIAGE.

SPECIFICATION forming part of Letters Patent No. 247,856, dated October 4, 1881.

Application filed May 14, 1881. (No model.)

*To all whom it may concern:*

Be it known that I, JONATHAN C. TAYLOR, of Westport, Fairfield county, in the State of Connecticut, have invented a new and useful Weeding-Carriage, of which the following is a specification.

In the first weeding of onions and some other crops the weeds are usually larger than the plants, and the first weeding requires that the face of the workman shall be near the ground. The hands, either bare or armed with some suitable implements, are applied directly to the work. The position, whether bending, squatting, or kneeling, becomes painful if prolonged.

My weeding-carriage is adapted to support the forward part of the person at the proper low position. It may be used either constantly or at intervals. The same carriage may be used alternately by different members of a gang. It serves as a rest for the muscles of the back, and allows the hands to continue their labor. The posture for which this carriage is adapted is that of kneeling. The operators kneel astride of the respective rows and propel the carriage along by their lower limbs, while the hands and arms of each are respectively working on the row beneath. Adjustments are provided to allow the carriage to hold the operators at different heights, according to their sizes or length of arms, also to adapt the carriage to different widths of rows. The carriage may be used by only one person, if desired. In such case his weight will rest on the carriage directly or through the interposition of a cross-band or other properly-yielding support. When three are working the weight of the second and third is suspended from elastic arms, which extend outward and rearward a sufficient distance.

The accompanying drawings form a part of this specification, and represent what I consider the best means of carrying out the invention.

Figure 1 is a plan view, and Fig. 2 a side elevation. Fig. 3 is a cross-section through certain parts on a larger scale. Fig. 4 is a perspective view, showing the machine in condition for use, having the spring-arms detached. Figs. 5 and 6 show details on a large scale. Fig. 6 is a vertical section through one of the wheels and the adjacent portion of the frame.

Similar letters of reference indicate corresponding parts in all the figures.

I employ a rigid frame-work, composed of sticks of ash or other suitable wood, $A'$ $A^2$, crossing each other to constitute a platform. $A^3$ $A^4$ are end pieces fitted thereto, and forming a unit therewith. I will designate the whole frame-work $A'$ $A^2$ $A^3$, &c., when necessary, by the single letter A.

B B are adjustable arms of wrought-iron, secured by bolts $b$ $b$.

C C are light wheels of cast-iron, mounted on centers D D, which are fitted in holes in the arms B and secured by nuts $D'$. There are several holes in the cross-frames $A^3$ $A^4$, which allow the bolts $b$ to be taken out and inserted again with the wheel in a position to treat narrower or wider rows. The forward wheels are near together, and are intended to stride over one row. The hind wheels are farther apart, and are intended to embrace or stand astride of three rows.

E E are sufficiently stout springs of metal fixed adjustably on the framing and extending rearward and diverging to afford supports for flexible straps G, and which latter apply under the arms, or in other ways found most convenient. They may be changed at short intervals to accommodate the wearer. One person may be suspended from each of the spring-arms, or they may jointly support one person. A description of one of the springs and straps may suffice for both.

Fastenings H and I confine the spring E to the framing. The bolt H may be set down tightly to the rear cross-bar, $A^3$. The strap I embraces the spring and also one of the diagonal sticks $A'$ $A^2$, as it is adjusted by a thumb-screw, M, the point of which engages in a metal socket (not shown) in the framing, and allows the spring E to rise at the forward end and correspondingly to sink at the rear end. On the latter one of the attendants rests a portion of his weight through the strap G. When it is desired to lower the rear end the screw M is slackened, allowing the forward bend of the spring to rise. When it is desired to raise the rear end, and consequently to support the body of the attendant who depends thereon, higher, all that is necessary is to screw more tightly by the same corresponding screw M. The bolts may be operated by the thumb and finger, or by any suitable wrench. The other attendant—the one who rests directly upon the carriage—may have a corresponding spring-support attached to a position forward; but I do not deem it necessary. The form of the carriage allows him to rest on the cross-sticks A′ A² either directly or through the interposition of a suitable shield or cushion.

J J are rods or stout wires fitting in suitable holes in the framing, and connected across at the top. They support light rods K, between which is stretched a screen, L, which is of sufficient size, and adjustable in position, according to the position of the sun. This is mainly important in the middle of the day.

The screen or awning L may be shifted forward and backward on the frame K. So, also, the latter may be shifted to a considerable extent forward and backward on the rods J. Several hooks are provided on the under side of the frame, as indicated at k. The mode of engagement of the rods J therewith is indicated in Fig. 5.

The framing J K can be easily taken apart and stored in any convenient position when the device is out of use. The remainder of the apparatus is strong, and can be stored with the other farm utensils.

In moving the device from the barn to the field or elsewhere it can either be dragged or pushed, traveling on its wheels; or, as will be preferred, over ordinary rough ground, a man will carry the whole clear of the ground, standing within the triangle in the rear portion of the framing and taking hold of the diagonal parts A′ A² at the points where the construction will balance.

It will be understood that the carriage is adapted to be worked with one operator alone, or with three, as circumstances may dictate.

Modifications may be made in the form and proportions of the details. I can use other material than designated for the several parts. Where wood is employed for the framing it may be strengthened by metal at and near the crossing of the parts A′ A². The parts A′ A² may not be crossed, as shown, but, as may readily be understood, may be carried to the front frame, A⁴, on either side, and have a brace run between them at a suitable point, to give the proper stiffness. When only one is using the machine he may ride in the same position as before indicated, or he may rest his weight farther at the rear, the cross-bar being smoothed and shaped to receive a portion of the weight of the body. The support thus afforded, being different from that farther forward, affords an agreeable change from one position to the other at intervals. There may be several holes into which the bolts H may be shifted to alter the direction of the springs E, so as to adjust the positions of the workmen depending thereon for the wider or narrower rows.

The machine, when completed, is adapted to carry three operators—one on the framing direct, and two others suspended on the springs at the rear; but an important and material portion of the benefits of the invention may be realized by omitting to attach the parts E and G and employing the remaining parts to carry one operator alone.

I claim as my invention—

1. The rigid cross-frames A′ A² and suitable end connections, A³ A⁴, provided with wheels C, adapted to support the body of the operator near the earth, with his hands free to work in the earth below, as herein specified.

2. The carriage described, adapted to support the upper portion of the body of the operator either at or near the forward portion, or at the rear, as herein specified.

3. In a weeding-carriage, the spring-arms E and straps G, adapted to support additional operators, in combination with the framing A, wheels C, and suitable connecting-arms, B, as herein specified.

4. The adjusting-screws M, in combination with the springs E, straps G, and carriage A B C, adapted to allow the raising and lowering of either or both springs relatively to the carriage, as herein specified.

In testimony whereof I have hereunto set my hand, at Westport, Connecticut, this 28th day of April, 1881, in the presence of two subscribing witnesses.

JONATHAN C. TAYLOR.

Witnesses:
MOSES W. WILSON,
JAS. S. RICHARDS.